United States Patent
Smith

(10) Patent No.: US 10,523,765 B2
(45) Date of Patent: Dec. 31, 2019

(54) TELECOMMUNICATIONS NETWORK COMMUNICATION SESSIONS

(71) Applicant: VODAFONE IP LICENSING LIMITED, Newbury, Berkshire (GB)

(72) Inventor: Kevin Smith, London (GB)

(73) Assignee: VODAFONE IP LICENSING LIMITED, Newbury, Berkshire (GB)

(*) Notice: Subject to any disclaimer, the term of this patent is extended or adjusted under 35 U.S.C. 154(b) by 187 days.

(21) Appl. No.: 15/433,610

(22) Filed: Feb. 15, 2017

(65) Prior Publication Data

US 2017/0237607 A1 Aug. 17, 2017

(30) Foreign Application Priority Data

Feb. 16, 2016 (GB) .................................. 1602706.2

(51) Int. Cl.
*G06F 15/16* (2006.01)
*H04L 29/08* (2006.01)
(Continued)

(52) U.S. Cl.
CPC .......... *H04L 67/142* (2013.01); *H04L 67/104* (2013.01); *H04L 67/141* (2013.01); *H04W 36/0033* (2013.01); *H04W 92/20* (2013.01)

(58) Field of Classification Search
CPC ... H04L 67/142; H04L 67/141; H04L 67/104; H04W 36/0033; H04W 92/20
(Continued)

(56) References Cited

U.S. PATENT DOCUMENTS

| 7,546,124 B1* | 6/2009 | Tenneti | H04W 92/02 455/436 |
| 2004/0008645 A1* | 1/2004 | Janevski | H04W 36/0033 370/331 |

(Continued)

FOREIGN PATENT DOCUMENTS

EP   2201799   6/2010

OTHER PUBLICATIONS

Intellectual Patent Office Combined Search and Examination Report for GB1602706.2 dated Jul. 20, 2016.
Examination Report issued in Applicatio No. EP 17156546.8 dated Oct. 1, 2018.
(Continued)

*Primary Examiner* — Sm A Rahman
(74) *Attorney, Agent, or Firm* — Workman Nydegger

(57) ABSTRACT

A mobile telecommunications network includes a plurality of nodes for wireless communication with a mobile telecommunications device and a respective server associated with each of said nodes, each server having processing functions, wherein a processing function of a first one of the servers associated with a first one of the nodes is operable to support a communication session with the mobile telecommunications device to provide a service thereto. The processing function of the first one of the servers is operable to send data relating to the communication session to a second one of the servers associated with a second one of the nodes for use by a processing function of the second one of the servers to enable the processing function of the second one of the servers to support the communication session and provide continuity of the communication session if the mobile telecommunications device moves from registration with the first one of the nodes to the second one of the nodes.

21 Claims, 2 Drawing Sheets

(51) Int. Cl.
*H04W 36/00* (2009.01)
*H04W 92/20* (2009.01)

(58) Field of Classification Search
USPC .......................................................... 709/223
See application file for complete search history.

(56) References Cited

U.S. PATENT DOCUMENTS

| | | | |
|---|---|---|---|
| 2007/0101122 A1* | 5/2007 | Guo ...................... | H04L 63/061 |
| | | | 713/153 |
| 2010/0039987 A1* | 2/2010 | Hegde ................... | H04W 40/02 |
| | | | 370/328 |
| 2014/0105174 A1 | 4/2014 | Agrawal et al. | |
| 2014/0280470 A1 | 9/2014 | Calco et al. | |
| 2015/0381756 A1 | 12/2015 | Lotfallah et al. | |

OTHER PUBLICATIONS

Triadimas Arief Satria, "Seamless Service Continuity in Cloud Based LTE Systems" Nov. 18, 2013, XP055508157, retreived on Sep. 19, 2018, URL: https://essay.utwente.nl/64557/1/Report_Master_Thesis_Triadimas_Final.pdf.
Search Report issued in GB1602706.2 dated Jul. 20, 2016.
European Search Report issued in EP 17156546 dated Jun. 30, 2017.
ETSI "Mobile-Edge Computing (MEC); Technical Requirements" Feb. 12, 2016.
IGR "Mobile Edge Computing: The Edge is the Future" iGR Research Catalog, Aug. 28, 2015.
Mishchenko "Chapter 4: Installation Options in VMware for ESXi; Planning, Implementation, and Security" Nov. 1, 2010, pp. 93-143.
Kreher et al. "Chapter 2.6; Inter-eNodeB Handover over X2" In LTE Signaling; Troubleshooting and Optimization, Dec. 16, 2010. pp. 157-160.

* cited by examiner

TELECOMMUNICATIONS NETWORK COMMUNICATION SESSIONS

This application claims benefit and priority to GB Application Number 1602706.2, filed on Feb. 16, 2016, the entirety of which is incorporated herein by reference.

TECHNICAL FIELD

The present invention relates to a mobile telecommunications network including a plurality of nodes, at least one of which is for wireless communication with a mobile telecommunications device, and a respective server associated with each of said nodes, each server having processing functions, wherein a processing function of a first one of the servers associated with a first one of the nodes is operable to support a communication session with the mobile telecommunications device to provide a service thereto.

BACKGROUND TO THE INVENTION

In 3G (UMTS) networks, an RNC (Radio Network Controller) is connected to multiple base stations (Node Bs). One of the RNC functions is to manage handover between Node Bs during mobility; i.e. where a handset moves from being attached to one Node B (the source) to another (the target).

In 4G/LTE, the eNodeBs are also physically connected via a common controller: the Serving Gateway (SGW), which also acts as a mobility anchor during handover. However, there is also a new interface: X2. This is generally a point-to-point interface between adjacent eNodeBs without need to go via the SGW. In summary, the usual route data takes is from the internet, via the SGW and source eNodeB to the terminal. During handover the source eNodeB creates a one-time tunnel to the target eNodeB using the X2 interface, and proxies the data traffic through that (bypassing the SGW). Once the handover is complete, the tunnel is removed and data travels via the SGW to the target eNodeB (the SGW to target eNodeB connection is being established in the background during handover).

Mobile Edge Computing involves processing power hosted at (or close to) the network edge, typically an eNodeB. This brings benefits of low latency, since application data does not need to traverse the Internet, and hence improves customer experience.

The Edge cloud utilises servers installed at the radio network 'edge', usually the eNodeBs. By having processing/storage/server hardware one (or two) hops away from the terminal, it is possible to reduce latency and internet backhaul costs, as well as realise hyper-localised services relevant to a given eNodeB.

A cloud deployment of these servers involves virtual machines (VMs) that encapsulate the server-side of a given application into its own runtime. These VMs are then managed by a central controller ('Hypervisor') responsible for starting/stopping/provisioning them. Multiple VMs can run on a single Edge server, therefore many applications can benefit from the low-latency of reduced backhaul.

In known systems the target eNodeB is unaware of any session data that the VM collected during its tenure on the source eNodeB. Therefore the advantage of Edge servers (low latency) is mitigated by not having the advantage of session persistence. Internet servers (in contrast to edge servers) can persist sessions (they do not care which eNodeB the terminal is attached to, and the application session will persist) but do not have the advantage of low latency.

SUMMARY OF THE INVENTION

According to an aspect of the present invention, there is provided a mobile telecommunications network including:
a plurality of nodes, at least one of which is for wireless communication with a mobile telecommunications device; and
a respective server associated with each of said nodes, each server having processing functions;
wherein a processing function of a first one of the servers associated with a first one of the nodes is operable to support a communication session with the mobile telecommunications device to provide a service thereto;
characterised in that the processing function of the first one of the servers is operable to send, via an X2 interface, data relating to the communication session to a second one of the servers associated with a second one of the nodes, which is for wireless communication with the mobile telecommunications device, for use by a processing function of the second one of the servers to enable the processing function of the second one of the servers to support the communication session and provide continuity of the communication session if the communication session moves from being supported by the processing function of the first one of the nodes to being supported by the processing function of the second one of the nodes.

In an embodiment to be described at least one of the nodes is at the edge of the network.

In an embodiment to be described at least one of the nodes is in the Radio Access Network (RAN) of the mobile telecommunications network.

The nodes may communicate wirelessly with the mobile telecommunications device in accordance a cellular telecommunications Standard, such as LTE, UMTS, etc.

Some or all of the nodes may be base stations, such as eNodeBs for an LTE mobile telecommunications network. Such nodes are for wireless communication with a mobile telecommunications device.

Some of the nodes may be gateways, such as LTE SGWs.

The server may be associated with its node by being geographically associated. The server and node may be co-located/located at the same position. The server may be part of the node. The node may be part of the server. The server and the node may be provided in the same housing, such as a base station housing or a SGW housing.

The data may enable the second one of the servers to boot or bootstrap the processing function thereof.

The data may additionally or alternatively comprise session data and allows persistence of the communication session if the communication session moves from being supported by the processing function of the first one of the nodes to being supported by the processing function of the second one of the nodes, which in the first embodiment is when the mobile telecommunications device moves from registration with the first one of the nodes to the second one of the nodes—typically as occurs during a handover (handoff) procedure.

In the embodiments the session data is received by the processing function of the second one of the nodes.

The processing functions may be implemented as virtual machines.

In a first embodiment, the first one of the nodes may be operable for wireless communication with the mobile telecommunications device, and the arrangement may be such that, when the processing function of the first one of the servers sends the data relating to the communication session to the second one of the servers to support the communication session, continuity of the communication session is provided if the mobile telecommunications device moves from registration with the first one of the nodes to the second one of the nodes.

In the first embodiment, processing function of the first one of the servers is operable to send data relating to the communication session to the second one of the servers via a direct connection between the first one of the nodes and the second one of the nodes.

In the first embodiment, the first one of the nodes is operable to notify the first one of the servers of a prospective change of the mobile telecommunications device from registration with the first one of the nodes to the second one of the nodes. This allows the server to initiate the sending of the data prior to handover occurring.

In the first embodiment, the connection between the first one of the nodes and the second one of the nodes may comprise a physical X2 interface or a logical X2 interface. The X2 interface is defined in the LTE Standards.

In a second embodiment, the first one of the nodes is a gateway node, such as a SGW.

In the second embodiment, the connection between the first one of the nodes and the second one of the nodes comprises a logical X2 interface. The X2 interface is defined in the LTE Standards.

The present invention also provides a method of operating a mobile telecommunications network as defined in the claims.

An embodiment is particularly advantageous for mobile devices that are fast moving during a communication session, and that therefore move between nodes rapidly. The arrangement allows communication session persistence during handover and minimal latency. The user experience is therefore enhanced.

An embodiment provides bootstrapping (booting) a virtual machine on a target eNB from a different eNB (a source eNB) of an LTE telecommunications network using the X2 interface between the two eNBs. The virtual machine is used to provide application layer services to a UE.

Although the embodiments are described in relation to an LTE network, the invention is also applicable to other types of telecommunication networks that allow a processing function a first server associated with a first wireless node (e.g. base station) to send data relating to a communication session to a second server associated with a second wireless node (e.g. base station) for use by a processing function of the second server. Preferably the processing function of the first server sends data relating to the communication session to the second server via a direct connection between the first wireless node and the second wireless node.

BRIEF DESCRIPTION OF THE DRAWINGS

For a better understanding of the present invention an embodiment will now be described by way of example, with reference to the accompanying drawings, in which.

In the figures, like elements are designated with the same reference sign.

DETAILED DESCRIPTION OF EMBODIMENTS OF THE INVENTION

Figure 1:
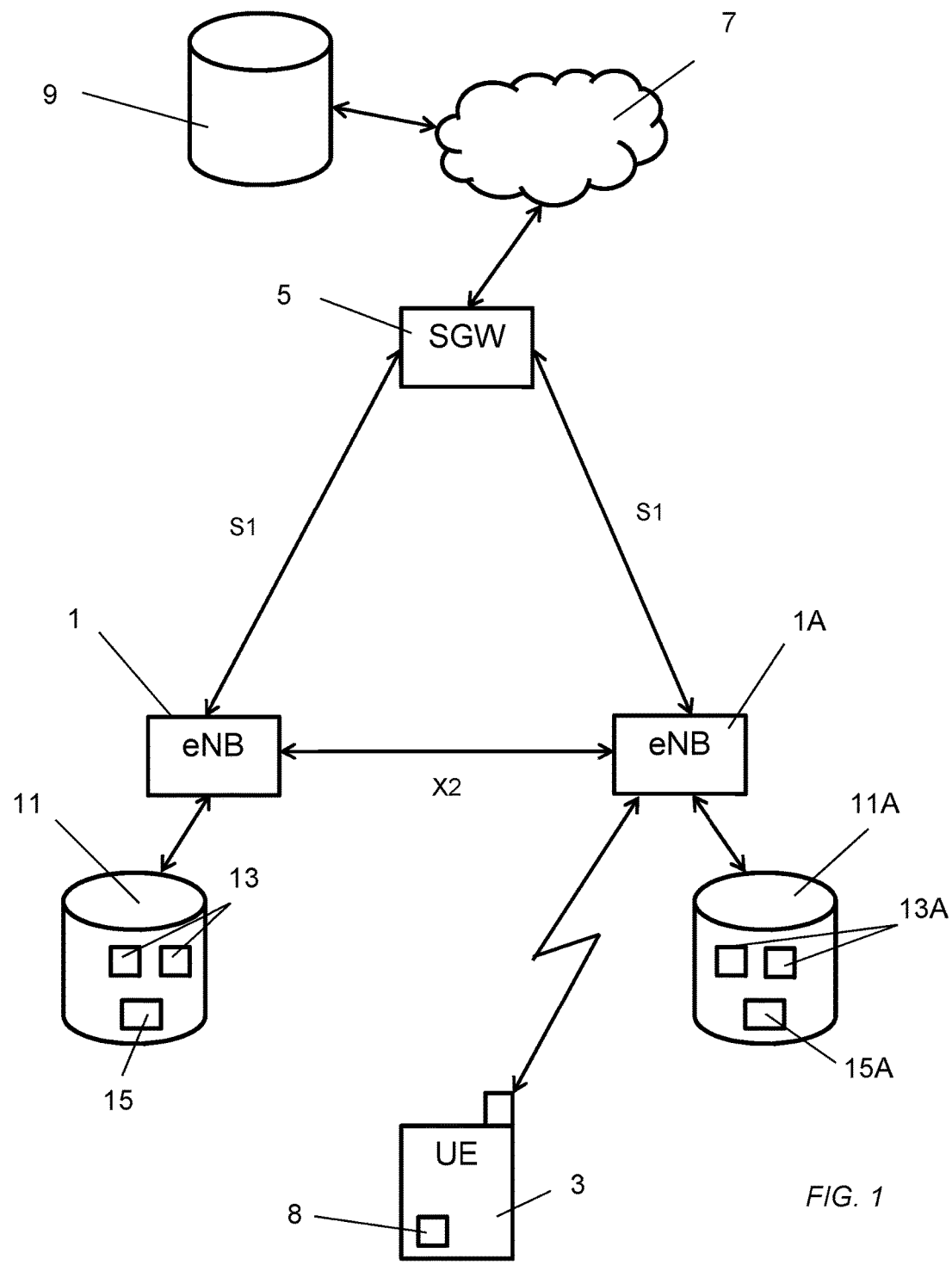
FIG. 1 shows schematically elements of a telecommunications network in accordance with a first embodiment of the invention.

FIG. 1 shows schematically elements of an LTE network provided with additional edge server capability.

The network comprises a plurality of base stations, referred to as eNodeBs (eNBs), 1 and 1A. In practice, a multiplicity of eNodeBs will be provided. Each eNodeB provides wireless communication services to mobile devices registered therewith. In FIG. 1 one mobile telecommunications device (UE) 3 is shown, and that is initially registered with eNodeB 1.

Each of the eNodeBs 1, 1A is connected to a Serving GateWay (SGW) 5 via an S1 interface. More than one SGW may be provided in a telecommunications network. The SGW 5 may receive data for transmission to the mobile device 3 via the eNodeB 1 from the Internet 7 or any other source. Of course, data may also be transmitted in the other direction, from the mobile device 3.

An X2 interface is provided between eNodeBs 1 and 1A in order to allow the exchange of information therebetween. When direct communication between eNodeBs is possible via a direct communication link, this is referred to at using the physical X2 interface.

Conventionally, if the mobile device 3, typically using an application 8 installed thereon, needs to perform a transaction (such as the exchange of data) with a remote server 9, a communication session between the server 9 and the mobile device 3 is established. Communication session data are sent via the Internet 7, the SGW 5 and the eNodeB 1.

When the mobile device moves relative to the eNodeB 1 (or when the radio conditions change for some other reason), and it is determined that a different eNodeB, eNodeB 1A in this example would provide better wireless coverage, a handover operation is performed.

In the conventional way, when it is determined that a handover should be performed from the eNodeB 1 to the eNodeB 1A, a handover procedure is performed which includes a "handover request" message being sent from the eNodeB 1 to the eNodeB 1A via the X2 interface between the eNodeBs. The eNodeB 1 is referred to as the source eNodeB, whilst the eNodeB 1A is referred to as the target eNodeB.

If the eNodeB 1A accepts the handover request, it issues a "handover request acknowledge" message and sends this via the X2 interface to the eNodeB 1.

The eNodeB 1 then issues a handover command to the mobile device 3 which will then register with the eNodeB 1A. The SGW 5 is notified of the handover and will then direct communication session data to the eNodeB 1A. During the period that the SGW 5 is unaware of the handover, the X2 interface is used to tunnel communication session data directly from the eNodeB 1 to the eNodeB 1A so that this can be received by the mobile device 3 during the handover.

The above is a very brief summary of the known handover operation. It is also assumes that the handover will occur between two eNodeBs that are connected to the same SGW.

The transfer of data to/from the remote server 9 to the mobile terminal can take some time due to the distance and the number of network elements/nodes through which the data must travel, and also requires a sufficient capacity in the backhaul between the eNodeB and the remote server 9.

In order to reduce latency and backhaul requirements, it has been proposed to provide services at the "edge" of the mobile telecommunications network—that is, at the location of the eNodeBs. FIG. 1 shows an edge server 11 associated with the eNodeB 1 and an edge server 11A associated with the eNodeB 1A. For example, the edge servers 11 and 11A may be provided at the same location as their respective eNodeBs 1, 1A, and may be located in the same housing as the eNodeBs 1, 1A.

The 3GPP LTE standard allows an SGW to provide a logical X2 interface between two eNodeBs. In this case the X2 does not physically connect the eNodeBs directly—instead there is an X2 interface between the eNodeB 1 and SGW, and then an X2 interface between the SGW and eNodeB 1A. This X2 interface utilises (that is, travels over) the existing S1 interface in FIG. 1. The difference between the two scenarios (point-to-point physical X2 connection between eNodeBs; and logical X2 connection of two eNodeBs via a SGW) is simply the path taken.

The edge servers 11, 11A may provide a plurality of processing functions that allow services, such as those provided by the remote server 9 to be provided locally at the edge server 11. The processing functions may be implemented by virtual machines 13 on edge server 11 and virtual machines 13A on edge server 13A.

For example, if, instead of the remote server 9 providing to the mobile terminal 3 a service of streaming a popular music video, by providing this service by virtual machine 13 on the edge server 11, latency and backhaul bandwidth requirement can be reduced. The content is stored on the edge server 11 and provided on request to the mobile device 3 by the virtual machine 13. In this example, the mobile device 3 application 8 receives the content and enables the video to be viewed by a user.

As the edge server 11 (and virtual machine 13) is co-located with the eNodeB 1, with which the mobile device 3 is registered, there is no need for the content to be transmitted via the backhaul connection to the remote server 9. However, although the conventional handover mechanism, briefly described above, allows a communication session to be maintained uninterrupted (session persistence) throughout a handover operation when the communication session is with a remote server, such as remote server 9, it does not allow session persistence when the service is provided locally on an edge server, such as edge server 11 or 11A.

The present embodiment uses the X2 interface in a novel and inventive way to provide session persistence when a service is provided locally by an edge server associated with an eNodeB when handover occurs from one eNodeB to another eNodeB, and hence the applicable edge server providing the service also changes.

According to the embodiment, the X2 interface between the source eNodeB 1 and the target eNodeB 1A is used to bootstrap a virtual machine 13A of the edge server 11A and to provision communication session data from the corresponding virtual machine 13 of the edge server 11 to the virtual machine 13A of the edge server 11A. By this mechanism the virtual machine 13A is started (or created), and is provided with communication session data, in advance of the handover occurring. The virtual machine 13A is thus in a state to maintain the communication session immediately when handover occurs, so there is no interruption in the communication session (session persistence).

According to the embodiment, an interface is provided from the source eNodeB 1 to the associated edge server 11 when the source eNodeB 1 determines that a handover is pending. When it is determined that a handover should occur, the eNodeB 1 sends a message via the interface to the edge server 11. The edge server 11 performs packaging of session data relating to the communication session between the virtual machine 13 and the mobile device 3 for transfer to the virtual machine 13A of the edge server 11A. The interface for handover notification may be bound to any server side programming language through implementation of the following Interface Definition Language specification:

```
[
  // header variables to identify the interface implementation
    uuid( ),
    version( )
]
interface handover_notification
{
  // types
    typedef long enb_id; // 20-bit ID for eNodeB, unique within
  an operator network
  // exceptions
    exception unknown_source_id {enb_id source_enodeb_id},
    exception unknown_target_id {enb_id target_enodeb_id}
  // operations
    void
    notify_handover (in enb_id source_enodeb_id, enb_id
  target_enodeb_id)
    raises (unknown_source_id),
    raises (unknown_target_id);
}
```

An interface is further provided from the edge server 11 to the source eNodeB 1 that allows the edge server 11 to inject data into the X2 user plane in response to the notification of a pending handover. This enables the packaged session data to be transmitted to the target eNodeB 1A via the X2 user plane. The interface for passing the session of the application may be bound to any server side programming language through implementation of the following Interface Definition Language specification:

```
[
  // header variables to identify the interface implementation
    uuid( ),
    version( )
]
interface handover_application_session
{
  // types
    typedef long enb_id,   // 20-bit ID for eNodeB, unique within
  an operator network
    typedef string application_id,   // identifier for the
  application being migrated
    typedef struct application_data   // application specific
  session data, used as init parametersfor the bootstrapped
  application,
    typedef integer application_data_length // length in bytes of
  the application data
  // exceptions
    exception unknown_target_id {enb_id target_enodeb_id},
    exception         max_length_exceeded         {integer
  session_data_length};
  // operations
    void
    handover_application_session (in enb_id target_enodeb_id,
  string application_id, application_data app_data)
    raises (unknown_target_id),
    raises (max_length_exceeded) // the implementer will publish
  the max length available for session data across X2 in their
  documentation
}
```

An interface is furthermore provided between the target eNodeB 1A and the edge server 11A associated therewith that allows data received on the X2 user plane (from the source eNodeB 1) to be extracted. This application/server-specific session data is then provisioned by the interface to the application-specific virtual machine 13A provided on the edge server 11A associated with the target eNodeB 1A. The interface for bootstrapping the application with the session persisted may be bound to any server side programming language through implementation of the following Interface Definition Language specification:

```
[
// header variables to identify the interface implementation
    uuid( ),
    version( )
]
interface bootstrap_application
{
// types
    typedef long enb_id,    // 20-bit ID for eNodeB, unique within
an operator network
    typedef string application_id,    // identifier for the
application being migrated
    typedef struct application_data   // application specific
session data, used as init parameters for the bootstrapped
application
// exceptions
    exception unknown_target_id {enb_id target_enodeb_id},
    exception unknown_application_id {string application_id},
    exception provisioning_failure (enum mec_server_error};
// operations
    void
    bootstrap_application (in enb_id target_enodeb_id, string
application_id, application_data app_data)
        raises (unknown_target_id),
        raises (unknown_application_id),
        raises (mec_server_error);
}
```

The interfaces defined above apply for both 'point-to-point' connection of two eNodeBs over X2, and logical connection via a SGW via the existing S1 interface. This therefore supports handover in the following scenarios:

where the eNodeBs share a common SGW; and where the eNodeB triggering the handover is on a different (adjacent) SGW to the target eNodeB. In the latter case, the procedure to support the X2 interface when the SGW has changed is defined in 3GPP TS 23.401.

A data model to encapsulate this data set is also provided. The data set is all the information items being passed along the interface. The data model places constraints on these information items (such as their order, frequency, length; and whether they are optional); and binds each information item to a data type (such as an integer or string). The "typedef" entries in the Interface Definition Language specifications above represent the data model.

According to the embodiment, the edge server 11, or the virtual machine 13 thereof, is able to discover if the X2 interface is available between the source eNodeB 1 and the target eNodeB 1A. This is useful, as in some circumstances an X2 interface will not be available. In such a circumstance, a fall-back mechanism is provided that instructs the SGW 5 S1 interface to propagate session data received from the virtual machine 13 to the virtual machine 13A. Alternatively, in the case of UMTS network components being used, the mechanism will instruct the RNC interface to propagate the session information.

Additionally, an interface is provided to enable session persistence to occur when the target eNodeB 11A is served by a different SGW to the SGW 5 that serves the source eNodeB 1. The interface propagates communication session information received from the virtual machine 13 by the SGW 5 to the different SGW that serves the target eNodeB, so that the data can be sent to the target edge server 11A for use by the virtual machine 13A. In this case, on receipt of the handover_notification request, the SGW 5 will use existing 3GPP intra-cell handover processes to determine that it needs to migrate the mobile device 3 to an eNodeB managed by a different SGW. Each SGW can expose the interface handover_application_session to adjoining SGWs. This allows the source SGW to request the target SGW to persist the application session.

According to the embodiment, the X2AP protocol is extended to allow the target eNodeB 11A to confirm that a message has been received from the source eNodeB 1. The extension is to the 3GPP standard TS36.243, section 8, 'Procedures'. A procedure for 'MEC (Mobile Edge Computing) Application Session Transfer' is added, to support the handover_application_session interface described above.

Each virtual machine 13, 13A is controlled by a hypervisor. The virtual machines 13 are created and run by a hypervisor 15 that is provided on the edge server 11. The virtual machines 13A are created and run by a hypervisor 15A provided on the edge server 11A.

According to this embodiment, the low-latency application session continues and is not affected by handover, because the target VM has been created in advance and is aware of the ongoing session.

Where an X2 interface exists between adjacent eNodeBs, it therefore provides a point-to-point channel for their adjacent edge servers to pass information.

X2 availability: X2 is optional in LTE and may be fulfilled 'virtually' via the SGW. In other words, if an attempt is made to use X2 and it is not in place, there will be an automatic fallback to pass the data via the SGW interface that always connects adjacent eNodeBs. Where the X2 is provided logically over the S1 interface between eNodeBs and the SGW, then the interfaces defined above will still operate—however the transport path will not be point-to-point between eNodeBs but via the SGW instead, Edge servers may also be placed at the SGW 5, which increases latency but may reduce deployment costs, since a SGW 5 is connected to multiple eNodeBs. In such an embodiment, there are virtual machine hosting capabilities at both the SGW and eNodeB—for example a main edge server at SGW for most virtual machine applications, and a smaller edge server at the eNodeB for certain ultra-low latency virtual machine applications. In this scenario the SGW hosts the virtual machine application, and the X2 interface definitions provided above may be used to bootstrap that VM application on an eNodeB that the SGW controls. The SGW achieves this by the logical X2 interface running over the existing SGW-to-eNodeB S1 interface. An example usage is if the SGW is running a virtual machine but calculates (or is told) that the particular application requires an even lower latency, and should be pushed right to the network edge—or vice versa, if it determined that the application would be better served by moving from eNodeB to the SGW.

Figure 2:
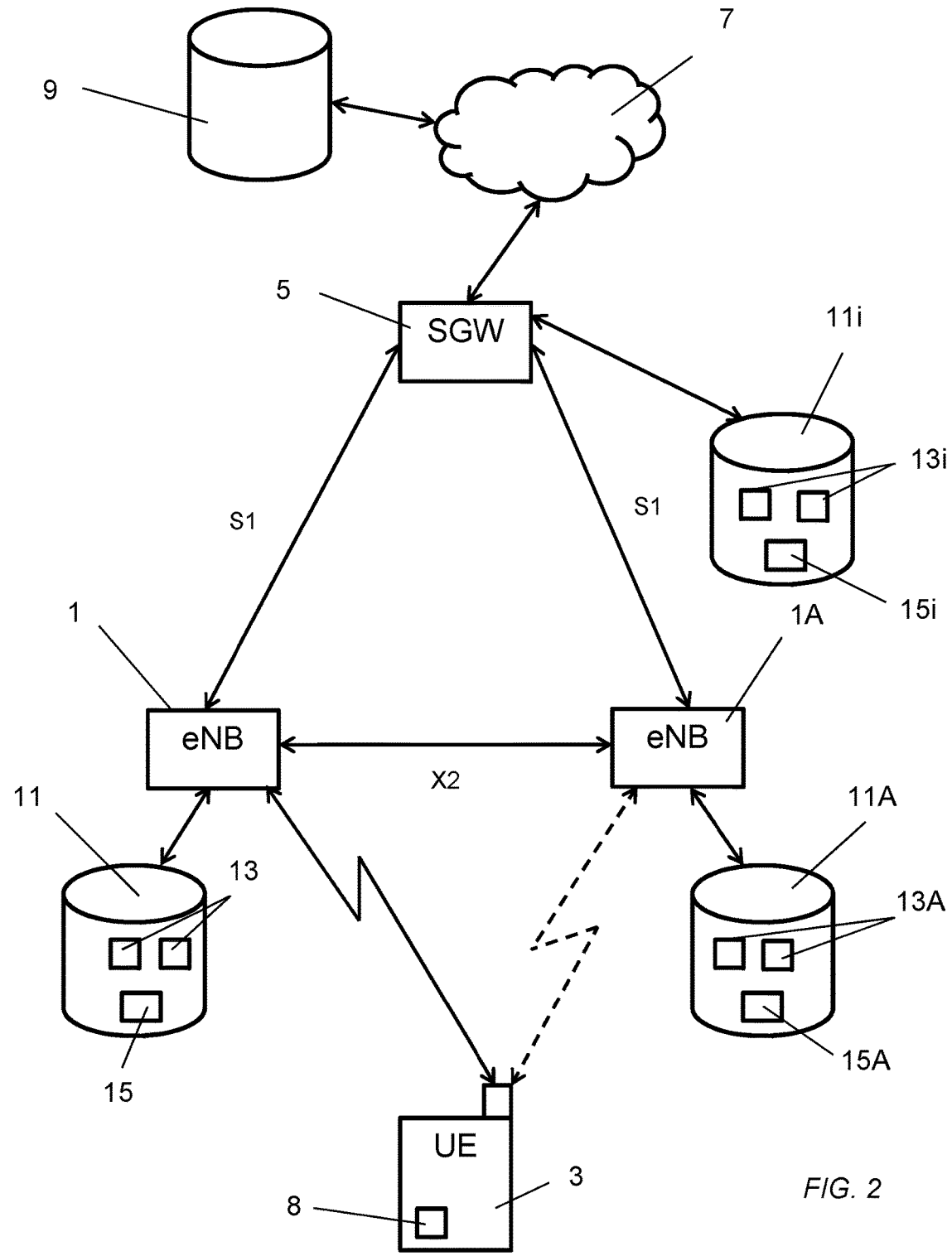
FIG. 2 shows schematically elements of a telecommunications network in accordance with a second embodiment of the invention.

Such an embodiment is shown in FIG. 2. In contrast to FIG. 1, FIG. 2 additionally includes a primary server 11*i* associated with the SGW 5. For example, the primary server 11*i* may be provided at the same location as the SGW 5, and may be located in the same housing as the SGW 5.

The 3GPP LTE standard allows an SGW to provide a logical X2 interface between two eNodeBs. In this case the X2 does not physically connect the eNodeBs directly—instead there is an X2 interface between the eNodeB 1 and SGW, and then an X2 interface between the SGW and eNodeB 1A. This X2 interface utilises (that is, travels over) the existing S1 interface between the SGW 5 and eNodeB 1A in FIG. 2. The difference between the two scenarios (point-to-point X2 connection between eNodeBs; and logical X2 connection of two eNodeBs via a SGW) is simply the path taken.

The primary server 11i may provide a plurality of processing functions that allow services, such as those provided by the remote server 9 to be provided locally at the primary server 11i. The processing functions may be implemented by virtual machines 13i on primary server 11i.

The virtual machine 13i is controlled by a hypervisor 15i that is provided on the SGW 5. The virtual machine 13i is created and run by a hypervisor 15i provided on the SGW 5.

In this embodiment, the edge server 11A of the eNodeB 1A is a secondary edge server and is controlled by the primary server 11i. The logical X2 interface (using the interface definitions provided above as necessary) may be used by the virtual machine 13i to bootstrap the virtual machine 13A associated with edge server 11A of the eNodeB 1A that the SGW 5 controls. The SGW 5 achieves this by the logical X2 interface running over the existing SGW-to-eNodeB S1 interface.

The virtual machine 13i at the primary server 11i calculates (or receives an indication) that a particular application provided by the virtual machine 13i requires a lower latency, and should be pushed right to the network edge. In the event of such a calculation/indication, the virtual machine 13i at the primary server 11i uses the logical X2 interface running over the existing SGW-to-eNodeB S1 interface to bootstrap the virtual machine 13A of the secondary edge server 11A and to provision communication session data (relating to the application to be transferred) from the corresponding virtual machine 13i of the primary server 11i to the virtual machine 13A of the secondary edge server 11A. By this mechanism the virtual machine 13A is started (or created), and is provided with communication session data, in advance of the session being transferred to the server 11A. The virtual machine 13A is thus in a state to maintain the communication session immediately when transfer occurs, so there is no interruption in the communication session (session persistence).

If it is desired to transfer an application from the edge server 11A to the primary server 11i, the logical X2 interface (using the interface definitions provided above as necessary) may be used by the virtual machine 13A to bootstrap the virtual machine 13i associated with primary server 11i of the SGW 5 controls. The edge server 11A achieves this by the logical X2 interface running over the existing eNodeB-to-SGW S1 interface. By this mechanism the virtual machine 13i is started (or created), and is provided with communication session data, in advance of the session being transferred to the server 11i. The virtual machine 13i is thus in a state to maintain the communication session immediately when transfer occurs, so there is no interruption in the communication session (session persistence).

The following are examples of advantageous applications of the embodiment.
 1. Automotive applications, in particular on high-speed roads.
  Being rapidly connected to the closest eNodeB is important for near-real-time driving conditions (e.g. to issue a warning such as "black ice 100 m ahead"). Such conditions should be reported by sensors from other cars connected to the service, so it is crucial to be rapidly connected to the local edge server get the fastest local updates.
 2. Connectivity on trains
  On high-speed trains passing a network of edge servers, consumers utilising services such as Mobile Edge hosted Video streaming will benefit from seamless handover between edge servers, and hence no buffering of content
 3. Low-latency Virtual Reality
  Virtual reality applications are highly latency-sensitive. The ability to minimise this latency in handover hence benefits the consumer experience. This effect is especially increased if the virtual reality application is being used whilst in rapid transit
 4. M2M and consumer applications
  Both human and M2M application consumers can benefit from the low latency provided by the embodiment when used in rapid transit.

Where an edge service involves nodeBs (i.e. a 3G network rather than LTE), then X2 will not exist. Therefore the existing RNC interface would be used as usual.

The invention claimed is:

1. A mobile telecommunications network including:
 a plurality of nodes, at least one of which is for wireless communication with a mobile telecommunications device; and
 a respective server associated with each of said nodes, each server having processing functions;
 wherein a processing function of a first one of the servers associated with a first one of the nodes is operable to support a communication session with the mobile telecommunications device to provide a service thereto;
 wherein the processing function of the first one of the servers is operable to send, via an X2 interface, data relating to the communication session to a second one of the servers associated with a second one of the nodes, which is for wireless communication with the mobile telecommunications device, for use by a processing function of the second one of the servers to enable the processing function of the second one of the servers to support the communication session and provide continuity of the communication session if the communication session moves from being supported by the processing function of the first one of the nodes to being supported by the processing function of the second one of the nodes,
 wherein the data enables the second one of the servers to bootstrap the processing function thereon,
 wherein, when the processing function of the first one of the servers sends the data relating to the communication session to the second one of the servers to support the communication session, continuity of the communication session is provided if the mobile telecommunications device moves from registration with the first one of the nodes to the second one of the nodes, and
 wherein the data is encapsulated within a data model, and the data model places one or more constraints on information included within the data, the one or more constraints including one or more of the following: an order of the information, a frequency of the information, a length of the information, or an indication as to whether the information is optional.

2. The network of claim 1, wherein the data comprises session data and allows persistence of the communication session if the communication session moves from being supported by the processing function of the first one of the nodes to being supported by the processing function of the second one of the nodes.

3. The network of claim 1, wherein the session data is received by the processing function of the second one of the nodes.

4. The network of claim 1, wherein the processing functions comprise virtual machines.

5. The network of claim 1, wherein the first one of the nodes is operable for wireless communication with the mobile telecommunications device.

6. The network of claim 5, wherein the processing function of the first one of the servers is operable to send data relating to the communication session to the second one of the servers via a direct connection between the first one of the nodes and the second one of the nodes.

7. The network of claim 5, wherein the first one of the nodes is operable to notify the first one of the servers of a prospective change of the mobile telecommunications device from registration with the first one of the nodes to the second one of the nodes.

8. The network of claim 5, wherein the connection between the first one of the nodes and the second one of the nodes comprises one of a physical X2 interface and a logical X2 interface.

9. The network of claim 1, wherein the first one of the nodes is a gateway node.

10. The network of claim 9, wherein the connection between the first one of the nodes and the second one of the nodes comprises a logical X2 interface.

11. A method of operating a mobile telecommunications network that includes a plurality of nodes, at least one of which is for wireless communication with a mobile telecommunications device, and a respective server associated with each of said nodes, each server having processing functions, wherein a processing function of a first one of the servers associated with a first one of the nodes is operable to support a communication session with the mobile telecommunications device to provide a service thereto, the method comprising:

the processing function of the first one of the servers sending, via an X2 interface, data relating to the communication session to a second one of the servers associated with a second one of the nodes, which is for wireless communication with the mobile telecommunications device, the data being used by a processing function of the second one of the servers to support the communication session and provide continuity of the communication session if the communication session moves from being supported by the processing function of the first one of the nodes to being supported by the processing function of the second one of the nodes, wherein the data enables the second one of the servers to bootstrap the processing function thereon, wherein, when the processing function of the first one of the servers sends the data relating to the communication session to the second one of the servers to support the communication session, continuity of the communication session is provided if the mobile telecommunications device moves from registration with the first one of the nodes to the second one of the nodes, and encapsulating the data within a data model, wherein the data model places one or more constraints on information included within the data, the one or more constraints including one or more of the following: an order of the information, a frequency of the information, a length of the information, or an indication as to whether the information is optional.

12. The method of claim 11, wherein the second one of the servers uses the data to bootstrap the processing function thereof.

13. The method of claim 11, wherein the data comprises session data and allows persistence of the communication session if the communication session moves from being supported by the processing function of the first one of the nodes to being supported by the processing function of the second one of the nodes.

14. The method of claim 11, wherein the session data is received by the processing function of the second one of the nodes.

15. The method of claim 11, wherein the processing functions are implemented by virtual machines.

16. The method of claim 11, wherein the first one of the nodes is for wireless communication with the mobile telecommunications device.

17. The method of claim 16, wherein the processing function of the first one of the servers sends data relating to the communication session to the second one of the servers via a direct connection between the first one of the nodes and the second one of the nodes.

18. The method of claim 16, wherein the first one of the nodes notifies the first one of the servers of a prospective change of the mobile telecommunications device from registration with the first one of the nodes to the second one of the nodes.

19. The method of claim 16, wherein the connection between the first one of the nodes and the second one of the nodes comprises a physical X2 interface or a logical X2 interface.

20. The method of claim 11, wherein the first one of the nodes is a gateway node.

21. The method of claim 20, wherein connection between the first one of the nodes and the second one of the nodes comprises a logical X2 interface.

* * * * *